Jan. 17, 1967   A. FISCHER   3,298,144
METHOD AND DEVICE FOR ADHESIVELY FASTENING AN EXPANSION
BOLT IN A BORE OF A WALL
Filed March 17, 1964   3 Sheets-Sheet 1
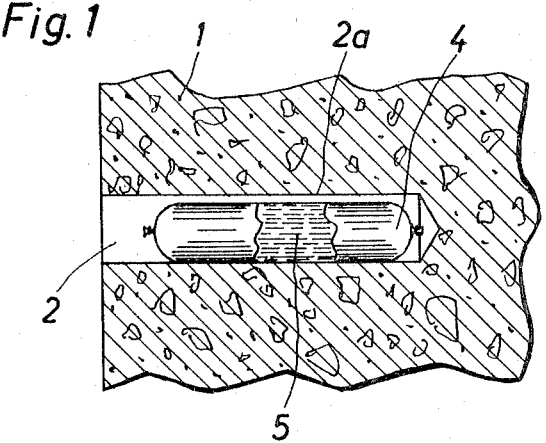
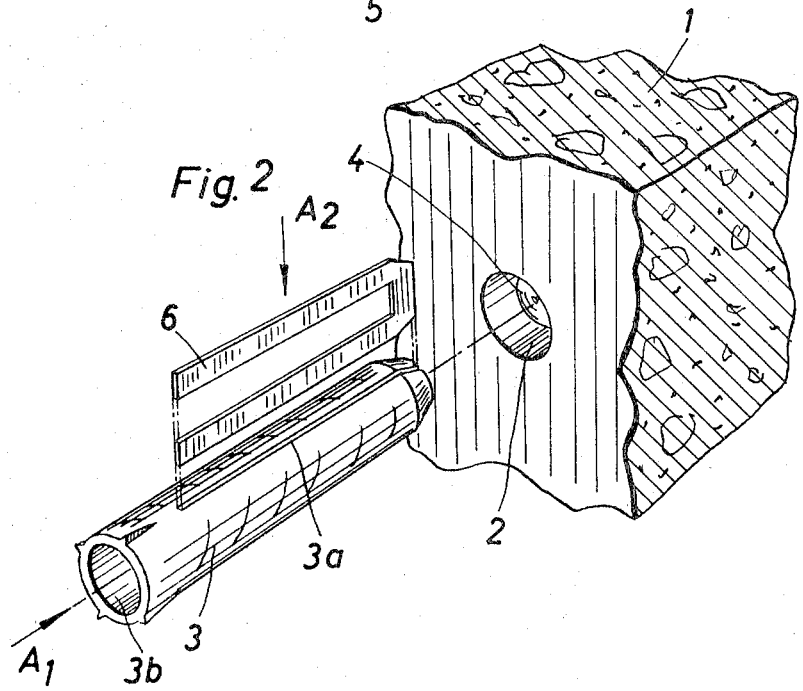
INVENTOR.
ARTUR FISCHER
BY Michael S. Striker
Attorney

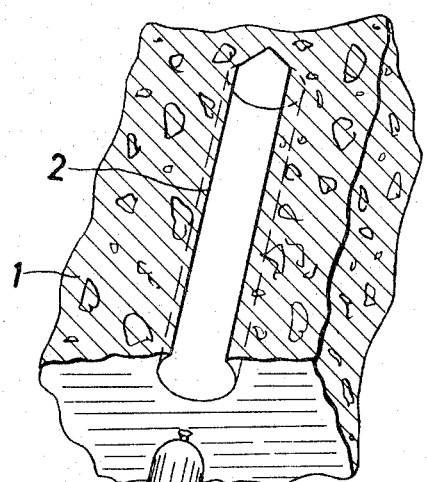
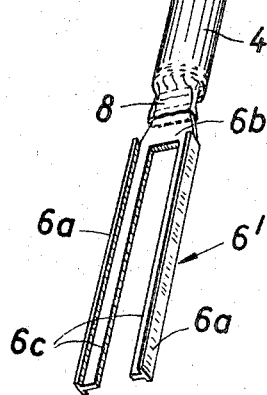
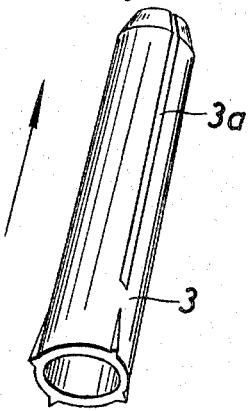
Fig. 5
Fig. 6

3,298,144
METHOD AND DEVICE FOR ADHESIVELY
FASTENING AN EXPANSION BOLT IN A
BORE OF A WALL
Artur Fischer, Tumlingen, Kreis
Freudenstadt, Germany
Filed Mar. 17, 1964, Ser. No. 352,488
Claims priority, application Germany, Mar. 20, 1963,
F 39,290
12 Claims. (Cl. 52—98)

The present invention relates to a method and device for adhesively fastening an expansion bolt in a bore of a wall, especially a wall of porous, soft material.

Various attempts have already been made to increase the adhesion strength of an expansion bolt in a bore of a wall, especially if the wall is formed from porous and soft material, by applying adhesive material to the outer surface of the expansion bolt so that the expansion bolt is not only properly anchored in the bore by expanding, but so that the outer surface of the expansion bolt is also adhesively attached to the surface forming the bore.

However, the various attempts so far made to increase the adhesive strength of an expansion bolt by the use of adhesive material applied to the outer surface of the bolt have not worked out in practice, especially if the bolt was used in wall portions formed from relatively soft material, since the adhesive material applied only to the outer surface of the bolt did not penetrate sufficiently in the wall portion surrounding the bore so that the adhesive strength of the expansion bolt did not materially increase, especially if the bolt was used in a bore formed in a wall of soft material.

It is an object of the present invention to provide a method for adhesively fastening an expansion bolt in a bore of a wall, especially in a wall of a porous, soft material, by means of which the adhesive strength of the fastened bolt can be considerably increased.

It is an additional object of the present invention to provide a method for adhesively fastening an expansion bolt in a bore of a wall, especially in a wall of porous, soft material, which will assure that the adhesive material will at least in part penetrate into the material surrounding the bore so as to form after hardening a very rigid connection between the expansion bolt and the surrounding wall portion.

It is a further object of the present invention to provide a method for adhesively fastening an expansion bolt in a bore of a wall which can be carried out in a quick and efficient manner.

It is yet an additional object of the present invention to provide a method for adhesively fastening an expansion bolt in a bore of a wall which will positively prevent penetration of adhesive material into the interior of the bolt.

It is also an object of the present invention to provide a device to facilitate execution of the aforementioned method and especially to prevent penetration of adhesive material into the expansion bolt during driving of the bolt in a hole of a wall.

With these objects in view, the method of the present invention for adhesively fastening an expansion bolt in a bore of a wall, especially a wall of porous, soft material, comprises the steps of partly filling the bore with hardenable adhesive material, and forcing an expansion bolt into the hole partly filled with the adhesive material so that the pressure thus created on the adhesive material will distribute the latter uniformly over any clearance between the expansion bolt and the inner surface of the bore and press part of the material into the wall portion surrounding the bore. The adhesive material may be injected into the bore to partly fill the same before the expansion bolt is forced thereinto, or the adhesive materials may be enclosed in a container of thin and tearable material which is placed into the bore to partly fill the same so that during driving of an expansion bolt into the partly filled hole the container will be torn and so that the adhesive material contained therein will be distributed over any clearance between bolt and bore surface and be pressed in part into the surrounding wall portion.

If the expansion bolt is a split bolt wth a central elongated cavity therethrough, the method of the present invention preferably includes also the step of sealing the split in the bolt so as to prevent penetration of adhesive material into the interior of the bolt during driving of the latter into the hole.

The device for facilitating execution of the method of the present invention includes sealing means, preferably in the form of a U-shaped sealing strip having a transverse portion and a pair of leg portions adapted to engage an expansion bolt with the transverse portion extending over one end of the latter and the leg portion extending over the slits in the bolt for sealing the same. Preferably, a closed container of thin, tearable material and filled with hardenable adhesive material [1] is fastened to the transverse portion of the sealing strip, projecting therefrom in a direction opposite that of the leg portion thereof, so that the sealing strip and the container can be placed as one unit in the bore in the wall.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a sectional side view of a bore in a wall adapted to receive an expansion bolt and showing a container filled with adhesive material located in the bore;

FIG. 2 is a perspective view showing a wall portion formed with a bore and an expansion bolt insertable in this bore;

FIG. 5 is an exploded perspective view showing a wall portion formed with a bore, an expansion to be driven in the bore and a device for sealing the slits in the expansion bolt and having a container of a tearable material filled with adhesive attached to one end thereof; and FIG. 6 is a partial perspective view showing a modification of the device shown in FIG. 5.

Figure 3:
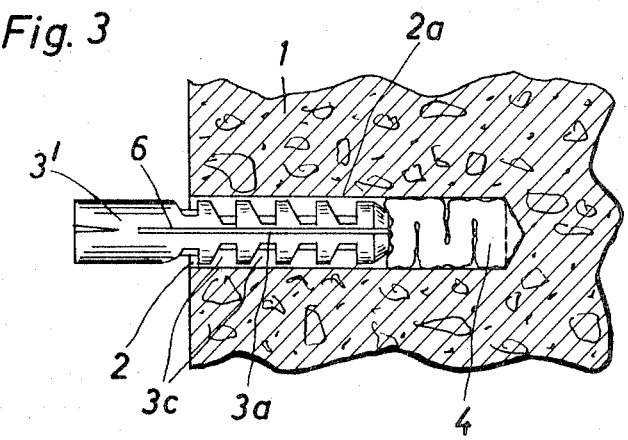
FIG. 3 is a partly sectioned side view showing an expansion bolt partly driven into a bore of a wall and compressing a container filled with adhesive material in the bore.

FIG. 1 shows part of a wall portion 1 formed with a blind bore 2 adapted to receive an expansion bolt. A closed container 4 of thin, flexible and tearable material, for instance thin plastic, and filled with a hardenable adhesive 5 in liquid or pasty condition [1] is placed into the bore 2 to partly fill the same as shown in FIG. 1. The container 4 is preferably elongated and cylindrical and of such a cross section so that the outer surface

---

[1] Such as adhesives in solutions, or of two components, or in form of dispersion, or glues.

thereof is spaced with a very small clearance from the inner surface 2a of the bore 2.

FIG. 2 shows in a perspective view the wall portion 1 with a bore 2 formed therein and with a container 4 filled with hardenable adhesive [1] located in the bore. FIG. 2 shows also an expansion bolt 3 ready to be driven in a direction of the arrow $A_1$ into the bore 2. The expansion bolt shown in FIG. 3 is of the slotted type, that is, the bolt 3 is formed with a pair of opposite slits 3a extending transversely from the outer surface of the bolt into the central longitudinal cavity 3b extending through the bolt, and longitudinally from the front end, shown in FIG. 2 as the right end, toward but short of the rear end of the bolt. The elongated central cavity 3b tapers toward the front end of the bolt so that the bolt, after being inserted into the bore 2, may be expanded at the front end thereof by driving a substantially cylindrical member or by screwing a screw into the central cavity 3b. FIG. 2 shows also a sealing means, or a U-shaped sealing strip 6 insertable in direction of the arrow $A_2$ into the slits 3a of the bolt for the purpose which will be described in detail later on.

FIG. 3 shows an expansion bolt 3' similar to that shown in FIG. 2 partly driven into the bore 2 and compressing the container 4 located at the end of the bore. The expansion bolt 3' shown in FIG. 3 differs from that shown in FIG. 2 in that the expansion bolt is formed with a plurality of grooves 3c forming saw-tooth-shaped teeth extending transversely to the slits 3a to opposite sides of the latter. A sealing strip 6 is shown located in the slits of the expansion bolt.

Figure 4:
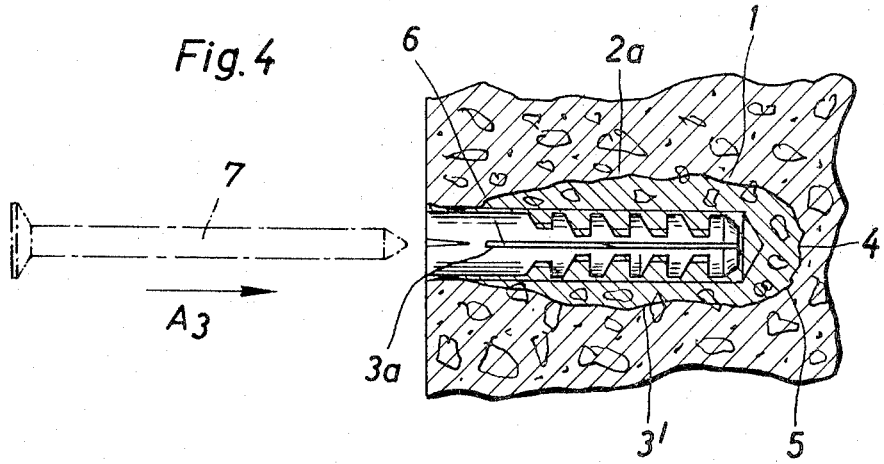
FIG. 4 is a sectioned side view similar to FIG. 3 showing the expansion bolt driven fully into the bore, and showing the container torn and the adhesive material previously contained therein in part driven into the wall material surrounding the bore.

FIG. 4 shows the expansion bolt 3' fully driven into the bore 2. During forcing of the expansion bolt 3' into the bore 2 the container 4 is subjected to such a pressure that it will tear and the pressure on the adhesive material thus freed from the container will distribute the adhesive material uniformly over any clearance between the outer surface of the expansion bolt 3 and the inner surface 2a of the bore and part of the material will also be pressed into the material of the wall portion 1 surrounding the bore. Of course, the length of the bore 2 has to be made substantially equal to the length of the expansion bolt or only slightly larger than the latter so that when the expansion bolt is fully driven in the bore as shown in FIG. 4 the container 4 is completely compressed and torn. The volume of the container may be varied depending on the type of the material from which the wall in which the bore is provided is formed.

The sealing strip 6 located in the slits 3a of the bolt will prevent penetration of adhesive material into the interior of the bolt during driving the same into the bore 2 and during crushing of the container 4 and release of the adhesive material therein.

Finally, the slotted expansion bolt is expanded at the inner end thereof by driving an elongated cylindrical member 7 in direction of the arrow $A_3$ into the tapered central cavity of the bolt. The member 7 may also be in form of a screw which is screwed into the central cavity. The expansion bolt may be formed from tough plastic material and this screw may have a self-tapping thread.

The adhesive material, after hardening, will form a rigid connection between the expansion bolt and the surrounding wall portion and thereby considerably increase the adhesive strength of the bolt.

The method for adhesively fastening an expansion bolt in the bore of a wall is not only usable when the wall is formed of porous or soft material, but the method of the present invention is also advantageously usable when the bore is formed in a concrete wall. The method may be used in connection with expansion bolts having a rough outer surface or with expansion bolts having a toothed outer surface as shown in FIGS. 3 and 4.

The container 4 may not only be formed from thin plastic material but also from any other thin tearable material which is substantially air-tight to prevent hardening of the hardenable adhesive material [1] contained therein during storage of the container.

Instead of placing the hardenable adhesive material in a container into the bore, it is also possible to inject the adhesive material under pressure into the bore before inserting the expansion bolt into the latter.

The expansion bolt adhesively fastened according to the present invention and properly expanded can be placed under load before the adhesive is completely hardened. Since penetration of the adhesive material into the interior of the expansion bolt is prevented by the sealing strip it is possible to unscrew the expansion screw whenever an article fastened by the expansion screw to the remainder of the bolt has to be exchanged.

FIG. 5 shows a device which greatly facilitates execution of the above described method for adhesively fastening an expansion bolt in a bore in the wall. As shown in FIG. 5, a closed elongated cylindrical container 4' formed from thin, flexible and tearable material and filled with hardenable adhesive material is attached at one end thereof to the transverse portion 6b of a U-shaped sealing strip 6' so that the container 4' and the sealing strip 6' form a single unit which can be pushed as a unit in a bore 2 of a wall 1. The end of the container 4' is attached to the transverse portion 6b of the sealing strip in a fluid-tight manner, for instance by heat sealing, and in this case the container 4' and the sealing strip 6' are preferably both formed from plastic material. The U-shaped sealing strip 6' has a pair of leg portions 6a projecting from the transverse portion 6b in a direction opposite to that of the container 4'. The legs 6a of the sealing strip have preferably a T-shaped cross section with the central webs 6c directed toward each other as shown in FIG. 5.

The central webs 6c on the legs of the sealing strip are insertable into the slits 3a formed in the expansion bolt 3 and the thickness and axial length of the webs 6c are chosen such so that the webs, when inserted into the slits 3a form a perfect seal for the latter.

During execution of the method of the present invention the expansion bolt 3 is moved in the direction of the arrow shown in FIG. 5 so that the webs 6c on the legs of the sealing strip become inserted into the slits 3a of the expansion bolt and seal the latter, whereafter the expansion bolt 3 with the sealing strip connected thereto and the container 4' is pushed in the bore 2 so that when the expansion bolt 3 is forced entirely into the bore, the container 4 will be torn and the adhesive material originally contained therein will be spread through any clearance between the expansion bolt and the inner bore surface and be partly forced into the material surrounding the bore in the manner as described before.

Instead of pushing the webs 6c into the slits 3a of the expansion bolt before the latter with the sealing strip 6' and the container 4' attached thereto is pushed into the bore 2, it is also possible to place first the container 4' with the sealing strip 6 attached thereto into the bore and to push then the sealing strip with the slits 3a aligned with the webs 6c into the bore whereby the legs of the sealing strip and the webs 6c thereon will properly guide the expansion bolt during its insertion into the bore.

FIG. 6 shows a slight modification of the device shown in FIG. 5. The unit formed of sealing strip and container shown in FIG. 6 differs from that shown in FIG. 5, in that the transverse portion 6b' of the sealing strip is in form of a substantially cylindrical reinforcement to

---

[1] Such as adhesives in solutions, or of two components, or in form of dispersion, or glues.

which one end of the container 4' is sealingly attached. The diameter of the transverse reinforced portion 6' shown in FIG. 6 may be such so as to tightly engage the inner surface of the open end of the container 4' to provide thereby a proper seal for this open end, or the one end of the container 4' may also be heat-sealed to the outer surface of the reinforced transverse portion 6b'.

It will be understood that the above described steps of the method as well as the various elements of the device may also find a useful application for adhesively fastening elements differing from the expansion bolt described above into a bore formed in a wall.

While the invention has been illustrated and described as a method of adhesively fastening expansion bolts and a device for facilitating execution of this method, it is not intended to be limited to the details shown and method steps described, since various modifications of such method steps and structural changes of the device may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method for adhesively fastening in a bore of a wall, especially a wall of porous, soft material, an expansion bolt having a hollow interior and provided with passage means connecting the interior with the outer surface of the bolt, comprising the steps of partly filling the bore with hardenable adhesive material; and forcing the expansion bolt into the partly filled bore while closing the passage means so that the pressure created on said adhesive material will distribute the adhesive material uniformly over any clearance between the expansion bolt and the inner surface of the bore and press part of the material into the wall portion surrounding the bore, whereby the adhesive material after hardening will form a rigid connection between the expansion bolt and the surrounding wall portion while the interior of the bolt will remain unobstructed by such material.

2. A method for adhesively fastening in a bore of a wall, especially a wall of porous, soft material, in expansion bolt having a hollow interior and provided with passage means connecting said hollow interior with the outer surface of the bolt, comprising the steps of inserting a closed container of thin, flexible and tearable plastic material filled with hardenable adhesive material into the bore to partly fill the same; and forcing the expansion bolt into the partly filled bore so as to tear the container and to distribute the adhesive material uniformly over any clearance between the expansion bolt and the inner surface of the bore by closing said passage means and to press part of the material into the wall portion surrounding the bore, whereby the adhesive material after hardening will form a rigid connection between the expansion bolt and the surrounding wall portion while the interior of the bolt will remain unobstructed by such material.

3. A method for adhesively fastening an expansion bolt formed with a central elongated cavity and slits extending between said central cavity and the outer surface of the bolt in a bore of a wall, especially a wall of porous, soft material, comprising the steps of partly filling the bore in the wall with hardenable adhesive material; sealing said slits in said expansion bolt; and forcing the expansion bolt into the hole partly filled with adhesive material so that the pressure thus created on the adhesive material will distribute the latter uniformly over any clearance between the expansion bolt and the inner surface of the bore and press part of the material into the wall portion surrounding the bore, whereby the adhesive material is prevented from penetrating into the central cavity of the bolt while the material after hardening will form a rigid connection between the expansion bolt and the surrounding wall portion.

4. A method for adhesively fastening in a bore of a wall, especially a wall of porous, soft material, an expansion bolt having a hollow interior and provided with passage means connecting said hollow interior with the outer surface of the bolt, comprising the steps of attaching a closed container of thin, flexible and tearable material filled with hardenable adhesive material to one end of the expansion bolt; forcing the expansion bolt with said one end leading into the hole so that the pressure thus created on the container will tear the same and so that the adhesive material contained therein will be distributed over any clearance between the expansion bolt and the inner surface of the bore while closing said passage means so that said material will be pressed in part into the wall portion surrounding the bore, whereby the adhesive material after hardening will form a rigid connection between the expansion bolt and the surrounding wall portion while the interior of the bolt will remain unobstructed by such material.

5. A method for adhesively fastening an expansion bolt formed with a central elongated cavity and slits extending between said central cavity and the outer surface of the bolt in a bore of a wall, especially a wall of porous, soft material, comprising the steps of placing sealing means in said slits with a closed container of thin, flexible and tearable material filled with hardenable adhesive material attached thereto so that the container projects from one end of said expansion bolt; and forcing the expansion bolt with said one end leading into the hole so that the pressure thus created on the container will tear the same and so that the adhesive material will be distributed over any clearance between the expansion bolt and the inner surface of the bore and be pressed in part into the wall portion surrounding the bore, whereby the adhesive material is prevented from penetrating into the central cavity of the bolt while the adhesive material after hardening will form a rigid connection between the expansion bolt and the surrounding wall portion.

6. A device to adhesively fasten an expansion bolt formed with a central cavity and slits between said central cavity and the outer surface of the bolt in a bore of a wall comprising, in combination, sealing means for covering said slits in said expansion bolt; and a container of thin, tearable material filled with hardenable adhesive material and fixed to said sealing means projecting from one end thereof so that said sealing means and said container may be placed as one unit in a bore of a wall, whereby during driving of an expansion bolt in said bore said container will be torn and the adhesive material will fill any clearance between the expansion bolt and the inner surface of the bore and be partly pressed into the surrounding wall portion while penetration of any adhesive material into the interior of the expansion bolt will be prevented by said sealing means.

7. A device to adhesively fasten an expansion bolt formed with a central cavity and a pair of opposite slits between said central cavity and the outer surface of the bolt in a bore of a wall comprising, in combination, a U-shaped sealing strip having a transverse portion and a pair of leg portions and adapted to engage an expansion bolt with said transverse portion extending over one end of the latter and said leg portions extending over said slits for sealing the same; and a container of thin, tearable material filled with hardenable adhesive material and fixed to said transverse portion and projecting therefrom in a direction opposite to that of said leg portions so that said sealing strip and said container may be placed as one unit in a bore of a wall, whereby during driving of an expansion bolt in said bore said container will be torn and the adhesive material will fill any clearance between the expansion bolt and the inner surface of the bore and be partly pressed into the surrounding wall portion while penetration of any adhesive material into the interior of the expansion bolt will be prevented by said sealing strip.

8. A device to adhesively fasten an expansion bolt formed with a central cavity and a pair of opposite slits between said central cavity and the outer surface of the bolt in a bore of a wall comprising, in combination, a U-shaped sealing strip having a transverse portion and a pair of leg portions and adapted to engage an expansion bolt with said transverse portion extending over one end of the latter and said leg portions extending over said slits for sealing the same; and an elongated cylindrical container of thin, tearable material filled with hardenable adhesive material and fixed to said transverse portion and projecting therefrom in a direction opposite to that of said leg portions so that said sealing strip and said container may be placed as one unit in a bore of a wall, whereby during driving of an expansion bolt in said bore said container will be torn and the adhesive material will fill any clearance between the expansion bolt and the inner surface of the bore and be partly pressed into the surrounding wall portion while penetration of any adhesive material into the interior of the expansion bolt will be prevented by said sealing strip.

9. A device to adhesively fasten an expansion bolt formed with a central cavity and a pair of opposite slits between said central cavity and the outer surface of the bolt in a bore of a wall comprising, in combination, a U-shaped sealing strip having a transverse portion and a pair of leg portions and adapted to engage an expansion bolt with said transverse portion extending over one end of the latter and said leg portions extending over said slits for sealing the same; and an elongated cylindrical container of thin, tearable plastic material filled with hardenable adhesive material and heat sealed to said transverse portion and projecting therefrom in a direction opposite to that of said leg portions so that said sealing strip and said container may be placed as one unit in a bore of a wall, whereby during driving of an expansion bolt in said bore said container will be torn and the adhesive material will fill any clearance between the expansion bolt and the inner surface of the bore and be partly pressed into the surrounding wall portion while penetration of any adhesive material into the interior of the expansion bolt will be prevented by said sealing strip.

10. A device to adhesively fasten an expansion bolt formed with a central cavity and a pair of opposite slits between said central cavity and the outer surface of the bolt in a bore of a wall comprising, in combination, a U-shaped sealing strip having a transverse portion and a pair of leg portions and adapted to engage an expansion bolt with said transverse portion extending over one end of the latter and said leg portions extending over said slits for sealing the same; a reinforcement on said transverse portion of said U-shaped sealing strip; and an elongated cylindrical container of thin, tearable material filled with hardenable adhesive material and heat sealed to said reinforcement and projecting therefrom in a direction opposite to that of said leg portions so that said sealing strip and said container may be placed as one unit in a bore of a wall, whereby during driving of an expansion bolt in said bore said container will be torn and the adhesive material will fill any clearance between the expansion bolt and the inner surface of the bore and be partly pressed into the surrounding wall portion while penetration of any adhesive material into the interior of the expansion bolt will be prevented by said sealing strip.

11. A device to adhesively fasten an expansion bolt formed with a central cavity and a pair of opposite slits between said central cavity and the outer surface of the bolt in a bore of a wall comprising, in combination, a U-shaped sealing strip having a reinforced substantially cylindrical transverse portion and a pair of leg portions and adapted to engage an expansion bolt with said transverse portion extending over one end of the latter and said leg portions extending over said slits for sealing the same; and an elongated cylindrical container of thin, tearable material filled with hardenable adhesive material and heat sealed to said cylindrical transverse portion projecting therefrom in a direction opposite to that of said leg portions so that said sealing strip and said container may be placed as one unit in a bore of a wall, whereby during driving of an expansion bolt in said bore said container will be torn and the adhesive material will fill any clearance between the expansion bolt and the inner surface of the bore and be partly pressed into the surrounding wall portion while penetration of any adhesive material into the interior of the expansion bolt will be prevented by said sealing strip.

12. A device to adhesively fasten an expansion bolt formed with a central cavity and a pair of opposite slits between said central cavity and the outer surface of the bolt in a bore of a wall comprising, in combination, a U-shaped sealing strip having a transverse portion and a pair of leg portions of substantially T-shaped cross sections and having central webs directed toward each other, said U-shaped sealing strip adapted to engage an expansion bolt with said transverse portion extending over one end of the bolt and said web portions located in said slits in sealing engagement with the bolt; and a container of thin, tearable material filled with hardenable adhesive material and fixed to said transverse portion and projecting therefrom in a direction opposite to that of said leg portions so that said sealing strip and said container may be placed as one unit in a bore of a wall, whereby during driving of an expansion bolt in said bore said container will be torn and the adhesive material will fill any clearance between the expansion bolt and the inner surface of the bore and be partly pressed into the surrounding wall portion while penetration of any adhesive material into the interior of the expansion bolt will be prevented by said sealing strip.

References Cited by the Examiner

UNITED STATES PATENTS

| | | | |
|---|---|---|---|
| 2,110,053 | 3/1938 | Phillips | 85—63 |
| 2,690,879 | 10/1954 | Snyder | 85—63 X |
| 2,829,502 | 4/1958 | Dempsey | 52—698 X |
| 2,849,866 | 9/1958 | Flygare et al. | 52—698 X |
| 3,108,443 | 10/1963 | Schuermann | 52—698 X |
| 3,188,815 | 6/1965 | Schuermann | 52—698 X |

FOREIGN PATENTS 99,818    4/1962    Norway.

FRANK L. ABBOTT, *Primary Examiner.*

M. O. WARNECKE, *Assistant Examiner.*